(12) United States Patent
Mujtaba et al.

(10) Patent No.: US 9,750,075 B2
(45) Date of Patent: *Aug. 29, 2017

(54) SINGLE-RADIO DEVICE SUPPORTING COEXISTENCE BETWEEN MULTIPLE RADIO ACCESS TECHNOLOGIES

(71) Applicant: Apple Inc., Cupertino, CA (US)

(72) Inventors: Syed A. Mujtaba, Santa Clara, CA (US); Wen Zhao, San Jose, CA (US); Xiaowen Wang, Cupertino, CA (US); Vinay Majjigi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/231,479

(22) Filed: Mar. 31, 2014

(65) Prior Publication Data

US 2014/0242984 A1 Aug. 28, 2014

Related U.S. Application Data

(63) Continuation of application No. 13/099,204, filed on May 2, 2011, now Pat. No. 8,688,160.

(51) Int. Cl.
*H04W 76/04* (2009.01)
*H04W 88/06* (2009.01)
*H04W 48/18* (2009.01)
*H04W 24/00* (2009.01)
*H04W 68/00* (2009.01)

(52) U.S. Cl.
CPC ......... *H04W 76/046* (2013.01); *H04W 48/18* (2013.01); *H04W 88/06* (2013.01); *H04W 24/00* (2013.01); *H04W 68/00* (2013.01)

(58) Field of Classification Search
CPC ... H04W 76/046; H04W 48/18; H04W 88/06; H04W 24/00; H04W 68/00
See application file for complete search history.

(56) References Cited

U.S. PATENT DOCUMENTS

| | | | |
|---|---|---|---|
| 2003/0144000 A1* | 7/2003 | Glazko | H04W 36/14 455/436 |
| 2004/0048597 A1* | 3/2004 | Khushu | H04W 4/02 455/404.2 |
| 2006/0025134 A1* | 2/2006 | Cho | H04W 60/06 455/435.1 |
| 2006/0030265 A1 | 2/2006 | Desai et al. | |

(Continued)

*Primary Examiner* — Mehmood B Khan
(74) *Attorney, Agent, or Firm* — Downey Brand LLP

(57) ABSTRACT

Electronic devices may be provided that contain wireless communication circuitry. The wireless communication circuitry may include radio-frequency transceiver circuitry coupled to antennas. An electronic device may include a baseband processor and other storage and processing circuitry that implements protocol stacks for handling multiple radio access technologies. The storage and processing circuitry may use the transceiver circuitry to convey data using a first radio access technology while periodically interrupting the conveying of the data to monitor a paging channel using a second radio access technology. In performing the paging channel monitoring operations, the storage and processing circuitry may enforce a time limit that ensures that operations using the first radio access technology are not disrupted more than desired.

20 Claims, 9 Drawing Sheets

(56) References Cited

U.S. PATENT DOCUMENTS

| | | | |
|---|---|---|---|
| 2006/0209801 A1* | 9/2006 | Joshi | H04W 88/06 370/352 |
| 2006/0246924 A1* | 11/2006 | Balasubramanian | H04W 68/00 455/459 |
| 2006/0292986 A1 | 12/2006 | Bitran et al. | |
| 2008/0123610 A1 | 5/2008 | Desai et al. | |
| 2008/0189970 A1* | 8/2008 | Wang | H04W 36/0055 33/701 |
| 2009/0232097 A1* | 9/2009 | Taneja | H04W 36/02 370/331 |
| 2009/0274121 A1 | 11/2009 | Bertorelle et al. | |
| 2010/0113008 A1* | 5/2010 | Wang | H04L 1/20 455/423 |
| 2011/0105119 A1* | 5/2011 | Bienas | H04W 36/0055 455/436 |
| 2011/0105122 A1* | 5/2011 | Wu | H04W 36/0083 455/436 |
| 2011/0199910 A1* | 8/2011 | Oh | H04W 52/0229 370/241 |
| 2011/0207465 A1* | 8/2011 | Dwyer | H04W 76/046 455/450 |
| 2011/0211466 A1* | 9/2011 | Kazmi | H04W 52/0261 370/252 |
| 2011/0216732 A1* | 9/2011 | Maeda | H04W 4/08 370/329 |
| 2011/0222451 A1* | 9/2011 | Peisa | H04W 52/0225 370/311 |
| 2011/0280221 A1* | 11/2011 | Chin | H04W 76/048 370/335 |
| 2012/0063419 A1* | 3/2012 | Zhao | H04W 24/04 370/331 |
| 2012/0115515 A1* | 5/2012 | Lopez | H04W 68/04 455/458 |
| 2012/0207040 A1* | 8/2012 | Comsa | H04W 72/1215 370/252 |
| 2012/0213162 A1* | 8/2012 | Koo | H04W 16/14 370/329 |
| 2012/0243417 A1* | 9/2012 | Henttonen | H04W 76/046 370/241 |
| 2012/0252452 A1* | 10/2012 | Martin | H04W 48/20 455/436 |
| 2012/0264416 A1* | 10/2012 | Pica | H04W 76/046 455/422.1 |
| 2012/0275366 A1* | 11/2012 | Anderson | H04W 52/0219 370/311 |
| 2012/0275448 A1* | 11/2012 | Chin | H04W 68/02 370/342 |
| 2012/0320810 A1* | 12/2012 | Nourbakhsh | H04W 52/0235 370/311 |
| 2012/0322515 A1* | 12/2012 | Hwang | H04W 76/068 455/574 |
| 2013/0029718 A1* | 1/2013 | Saito | H04W 36/24 455/525 |
| 2014/0031036 A1* | 1/2014 | Koo | H04W 36/20 455/434 |

* cited by examiner

|  | LTE IDLE | LTE ACTIVE |
|---|---|---|
| 1X IDLE | RADIO WILL TUNE TO 1X EVERY PAGING CYCLE REMAINDER OF TIME RADIO MAY MONITOR LTE PAGES | 1X WILL INTERRUPT LTE PERIODICALLY AT EVERY 1X PAGING CYCLE WHEN TUNED TO 1X, LTE SESSION WILL BEHAVE AS IF LTE RADIO IS IN FADE |
| 1X ACTIVE | RADIO CONTINUOUSLY TUNED TO 1X NO LTE POSSIBLE | RADIO CONTINUOUSLY TUNED TO 1X NO LTE POSSIBLE |

FIG. 6

SINGLE-RADIO DEVICE SUPPORTING COEXISTENCE BETWEEN MULTIPLE RADIO ACCESS TECHNOLOGIES

CROSS REFERENCE TO RELATED APPLICATIONS

This application is a continuation of U.S. application Ser. No. 13/099,204, filed May 2, 2011, entitled "SINGLE-RADIO DEVICE SUPPORTING COEXISTENCE BETWEEN MULTIPLE RADIO ACCESS TECHNOLOGIES", the disclosure of which is hereby incorporated by reference in its entirety for all purposes.

BACKGROUND

This application relates generally to wireless communication circuitry, and more particularly, to electronic devices that have wireless communication circuitry that supports multiple radio access technologies.

Electronic devices such as portable computers and cellular telephones are often provided with wireless communication capabilities. For example, electronic devices may use long-range wireless communication circuitry such as cellular telephone circuitry and WiMax (IEEE 802.16) circuitry. Electronic devices may also use short-range wireless communication circuitry such as WiFi® (IEEE 802.11) circuitry and Bluetooth® circuitry.

In some devices, it may be desirable to support multiple radio access technologies. For example, it may be desirable to support newer radio-access technologies for handling data sessions and older radio-access technologies for supporting voice calls. Examples of different radio-access technologies that have been used in cellular telephones include Global System for Mobile Communications (GSM), Universal Mobile Telecommunications System (UMTS), Code Division Multiple Access (CDMA) (e.g., CDMA2000 including standards such as CDMA2000 1XRTT), and Long Term Evolution (LTE).

In theory, an electronic device may support any number of desired radio access technologies by incorporating sufficient hardware resources into the device. For example, a device may operate an independent wireless circuit and a dedicated antenna for each radio access technology. In practice, however, such a scheme may be impractical. Besides the inefficiency of including a different radio chipset and antenna for each supported radio-access technology, this approach may not guarantee immunity from interference among the various radio access technologies.

It would therefore be desirable to be able to provide improved ways in which to support multiple radio access technologies in an electronic device.

SUMMARY

Electronic devices may be provided that contain wireless communication circuitry. The wireless communication circuitry may include radio-frequency transceiver circuitry coupled to antennas. An electronic device may include a baseband processor and other storage and processing circuitry that implements protocol stacks for handling multiple radio access technologies. The storage and processing circuitry may use the transceiver circuitry and antennas to convey data using a first radio access technology while periodically interrupting the conveying of the data to monitor a paging channel of a second radio access technology.

In performing the paging channel monitoring operations, the storage and processing circuitry may perform timing operations. The timing operations may be used to enforce a time limit on the paging channel monitoring operations. The time limit may be selected to ensure that data handling operations using the first radio access technology are not disrupted more than desired. For example, the time limit may be selected to prevent a Long Term Evolution radio access technology from transitioning from a radio resource control connected mode to a radio resource control idle mode (state). If desired, an even shorter time limit may be selected to prevent the Long Term Evolution radio access technology from transitioning from the radio resource control connected mode to a radio resource control connected state in which Long Term Evolution radio resource control re-establishment is required.

Further features of the invention, its nature and various advantages will be more apparent from the accompanying drawings and the following detailed description of the preferred embodiments.

BRIEF DESCRIPTION OF THE DRAWINGS

FIG. 6 is a table showing how an electronic device may support active and idle modes for multiple radio access technologies in accordance with an embodiment of the present invention.

DETAILED DESCRIPTION

Electronic devices may be provided with wireless communication circuitry. The wireless communication circuitry may be used to support multiple radio access technologies (communications protocols). For example, an electronic device may support communications with a Global System for Mobile Communications (GSM) radio access technology, a Universal Mobile Telecommunications System (UMTS) radio access technology, a Code Division Multiple Access (CDMA) radio access technology (e.g., CDMA2000 1XRTT or other CDMA radio access technologies), a Long Term Evolution (LTE) radio access technology, and/or other radio access technologies.

In some embodiments, an electronic device may be described that supports at least two radio access technologies such as LTE and CDMA2000 1XRTT (sometimes referred to herein as "1X"). Other radio access technologies may be supported if desired. The use of a device that supports two radio access technologies such as LTE and 1X radio access technologies is merely illustrative.

The two (or more) radio access technologies for the electronic device may be supported using shared wireless communication circuitry such as shared radio-frequency transceiver circuitry and a common baseband processor integrated circuit (sometimes referred to as a "radio"). A time division multiplexing scheme may be used by the device to ensure that the LTE and 1X radio access technologies can coexist. The time division multiplexing scheme may allow a single radio to be used to handle both LTE and 1X traffic.

For satisfactory performance, traffic associated with the 1X radio access technology may take precedence over traffic associated with the LTE radio access technology, because the 1X radio access technologies may be used to carry voice traffic, whereas the LTE radio access technology may be used to carry data traffic.

To avoid missing incoming 1X calls, a 1X paging channel is monitored once per paging cycle. To ensure that disruption to an active LTE data session is minimized, care can be taken to limit the amount of time that is spent monitoring the 1X paging channel during each paging cycle. By appropriately limiting the amount of 1X paging channel monitoring time, the probability of RRC connection re-establishment and loss of LTE Radio Resource Control (RRC) connectivity can be minimized.

Figure 1:
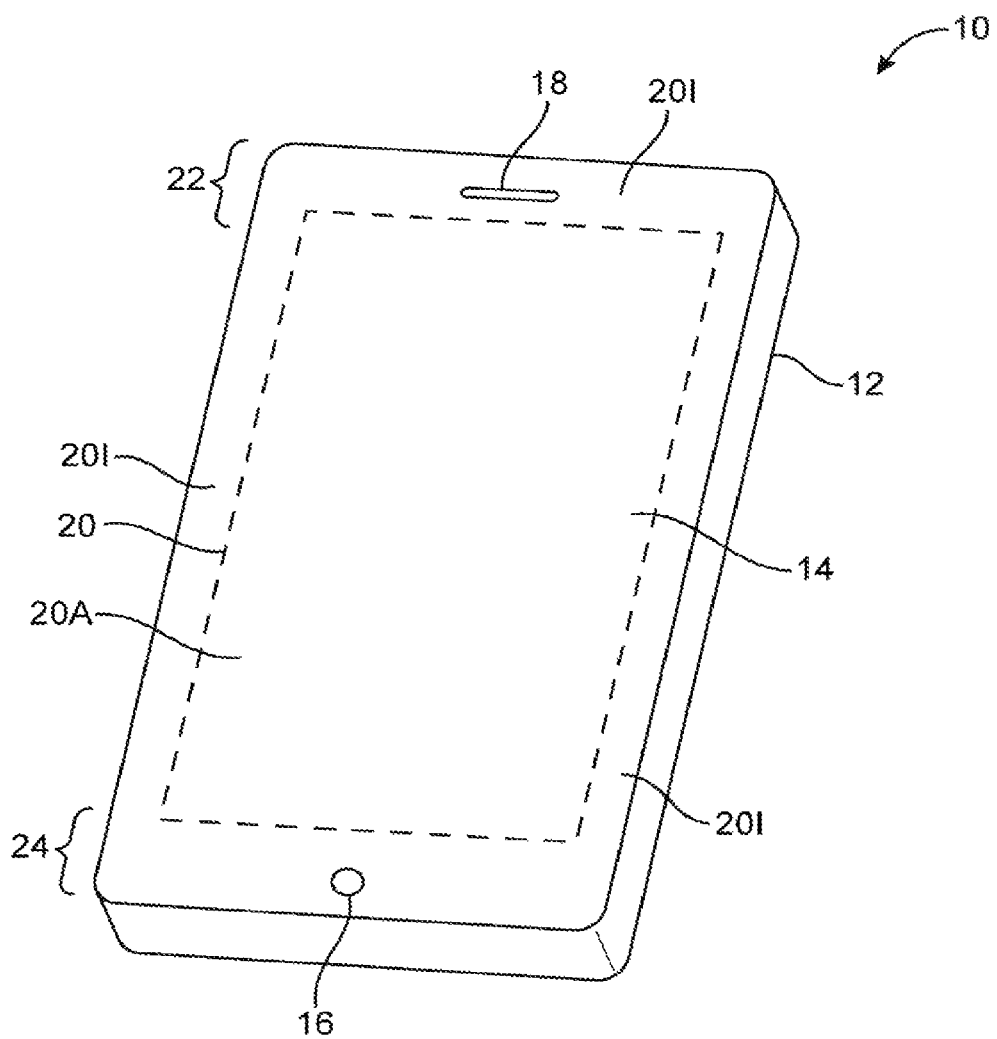
FIG. 1 is a perspective view of an illustrative electronic device with wireless communication circuitry in accordance with an embodiment of the present invention.

An illustrative electronic device of the type that may be used to support multiple radio access technologies is shown in FIG. 1. Electronic device 10 may be a portable electronic device or other suitable electronic device. For example, electronic device 10 may be a laptop computer, a tablet computer, a somewhat smaller device such as a wristwatch device, pendant device, headphone device, earpiece device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electronic ink elements, liquid crystal display (LCD) components, or other suitable image pixel structures. A cover glass layer may cover the surface of display 14. Portions of display 14 such as peripheral regions 201 may be inactive and may be devoid of image pixel structures. Portions of display 14 such as rectangular central portion 20A (bounded by dashed line 20) may correspond to the active part of display 14. In active display region 20A, an array of image pixels may be used to display images for a user.

The cover glass layer that covers display 14 may have openings such as a circular opening for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

Housing 12 may include a peripheral conductive member such as a bezel or band of metal that runs around the rectangular outline of display 14 and device 10 (as an example). The peripheral conductive member may be used in forming the antennas of device 10 if desired.

Antennas may be located along the edges of device 10, on the rear or front of device 10, as extending elements or attachable structures, or elsewhere in device 10. With one suitable arrangement, which is sometimes described herein as an example, device 10 may be provided with one or more antennas at lower end 24 of housing 12 and one or more antennas at upper end 22 of housing 12. Locating antennas at opposing ends of device 10 (i.e., at the narrower end regions of display 14 and device 10 when device 10 has an elongated rectangular shape of the type shown in FIG. 1) may allow these antennas to be formed at an appropriate distance from ground structures that are associated with the conductive portions of display 14 (e.g., the pixel array and driver circuits in active region 20A of display 14).

If desired, a first cellular telephone antenna may be located in region 24 and a second cellular telephone antenna may be located in region 22. Antenna structures for handling satellite navigation signals such as Global Positioning System signals or wireless local area network signals such as IEEE 802.11 (WiFi®) signals or Bluetooth® signals may also be provided in regions 22 and/or 24 (either as separate additional antennas or as parts of the first and second cellular telephone antennas). Antenna structures may also be provided in regions 22 and/or 24 to handle WiMax (IEEE 802.16) signals.

In regions 22 and 24, openings may be formed between conductive housing structures and printed circuit boards and other conductive electrical components that make up device 10. These openings may be filled with air, plastic, or other dielectrics. Conductive housing structures and other conductive structures may serve as a ground plane for the antennas in device 10. The openings in regions 22 and 24 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element such as an inverted-F antenna resonating element formed from part of a conductive peripheral housing structure in device 10 from the ground plane, or may otherwise serve as part of antenna structures formed in regions 22 and 24.

Antennas may be formed in regions 22 and 24 that are identical (i.e., antennas may be formed in regions 22 and 24 that each cover the same set of cellular telephone bands or other communications bands of interest). Due to layout constraints or other design constraints, it may not be desirable to use identical antennas. Rather, it may be desirable to implement the antennas in regions 22 and 24 using different designs. For example, the first antenna in region 24 may cover all cellular telephone bands of interest (e.g., four or five bands) and the second antenna in region 22 may cover a subset of the four or five bands handled by the first antenna. Arrangements in which the antenna in region 24 handles a subset of the bands handled by the antenna in region 22 (or vice versa) may also be used. Tuning circuitry may be used to tune this type of antenna in real time to cover either a first subset of bands, or a second subset of bands, and thereby cover all bands of interest.

If desired, an antenna selection control algorithm that runs on the circuitry of device 10 can be used to automatically select which antenna(s) are used in device 10 in real time. Antenna selections may, for example, be based on the evaluated signal quality of received signals. The antenna selection control algorithm may direct device 10 to operate in a multiple antenna mode (e.g., a dual antenna mode) or a single antenna mode. When operating in a single antenna mode, the antenna selection control algorithm may select which of multiple antennas is to be used in transmitting and/or receiving wireless signals.

Device 10 may use one antenna, two antennas, three antennas, four antennas, or more than four antennas if desired. Device 10 may use antennas that are substantially identical (e.g., in band coverage, in efficiency, etc.), or may use other types of antenna configurations.

Figure 2:
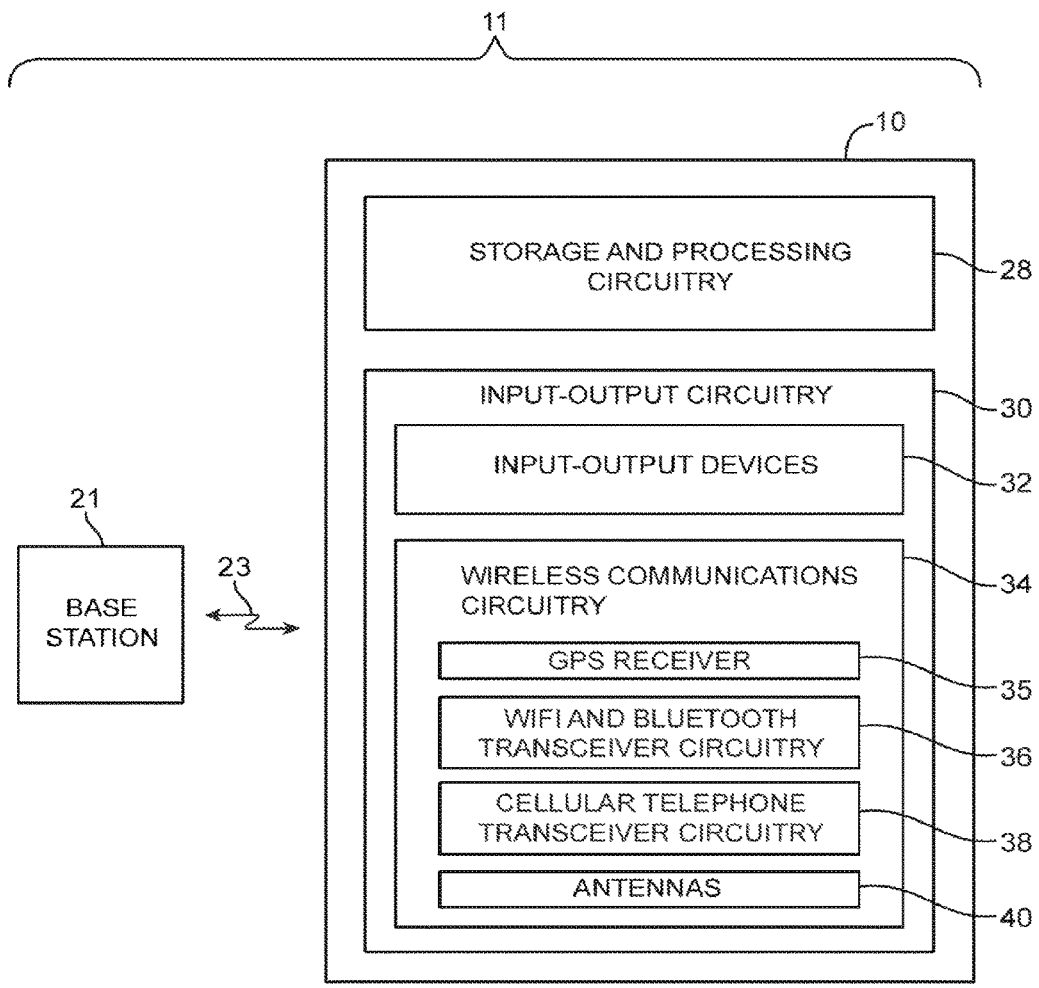
FIG. 2 is a schematic diagram of a wireless network including a base station and an illustrative electronic device with wireless communication circuitry in accordance with an embodiment of the present invention.

A schematic diagram of a system in which electronic device 10 may operate is shown in FIG. 2. As shown in FIG. 2, system 11 may include wireless network equipment such as base station 21. Base stations such as base station 21 may be associated with a cellular telephone network or other wireless networking equipment. Device 10 may communicate with base station 21 over wireless link 23 (e.g., a cellular telephone link or other wireless communication link).

Device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 and other control circuits such as control circuits in wireless communication circuitry 34 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VoIP) telephone call applications, email applications, media playback applications, operating system functions, etc. To support interactions with external equipment such as base station 21, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE802.16 (WiMax) protocols, cellular telephone protocols such as the Long Term Evolution (LTE) protocol, Global System for Mobile Communications (GSM) protocol, Code Division Multiple Access (CDMA) protocol, and Universal Mobile Telecommunications System (UMTS) protocol, etc.

Circuitry 28 may be configured to implement control algorithms for device 10. The control algorithm may be used to control radio-frequency switching circuitry and other device resources. For example, the control algorithm may be used to configure wireless circuitry 34 to switch a particular antenna into use for transmitting and/or receiving signals or may switch multiple antennas into use simultaneously. The control algorithm may also be used to activate and deactivate transmitters and receivers, to tune transmitters and receivers to desired frequencies, to implement timers, to compare measured device operating parameters to predetermined criteria, etc.

In some scenarios, circuitry 28 may be used in gathering sensor signals and signals that reflect the quality of received signals (e.g., received pilot signals, received paging signals, received voice call traffic, received control channel signals, received data traffic, etc.). Examples of signal quality measurements that may be made in device 10 include bit error rate measurements, signal-to-noise ratio measurements, measurements on the amount of power associated with incoming wireless signals, channel quality measurements based on received signal strength indicator (RSSI) information (RSSI measurements), channel quality measurements based on received signal code power (RSCP) information (RSCP measurements), reference symbol received power (RSRP measurements), channel quality measurements based on signal-to-interference ratio (SINR) and signal-to-noise ratio (SNR) information (SINR and SNR measurements), channel quality measurements based on signal quality data such as Ec/Io or Ec/No data (Ec/Io and Ec/No measurements), etc. This information and other data may be used in controlling which antenna mode is used (e.g., single antenna mode or dual antenna mode), may be used in selecting an optimum antenna in single antenna mode (if desired), and may be used in otherwise controlling and configuring device 10.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communication circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals.

Wireless communication circuitry 34 may include satellite navigation system receiver circuitry such as Global Positioning System (GPS) receiver circuitry 35 (e.g., for receiving satellite positioning signals at 1575 MHz). Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communication in cellular telephone bands such as bands at 700 MHz, 850 MHz, 900 MHz, 1800 MHz, 1900 MHz, and 2100 MHz or other cellular telephone bands of interest. Wireless communication circuitry 34 can include circuitry for other short-range and long-range wireless links if desired (e.g., WiMax circuitry, etc.). Wireless communication circuitry 34 may, for example, include wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communication circuitry 34 may include antennas 40. Antennas 40 may be formed using any suitable types of antenna. For example, antennas 40 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna (e.g., for handling WiFi® traffic or other wireless local area network traffic) and another type of antenna may be used in forming a remote wireless link antenna (e.g., for handling cellular network traffic such as voice calls and data sessions). As described in connection with FIG. 1, there may be multiple cellular telephone antennas in device 10. For example, there may be one cellular telephone antenna in region 24 of device 10 and another cellular telephone antenna in region 22 of device 10. These antennas may be fixed or may be tunable.

Figure 3:
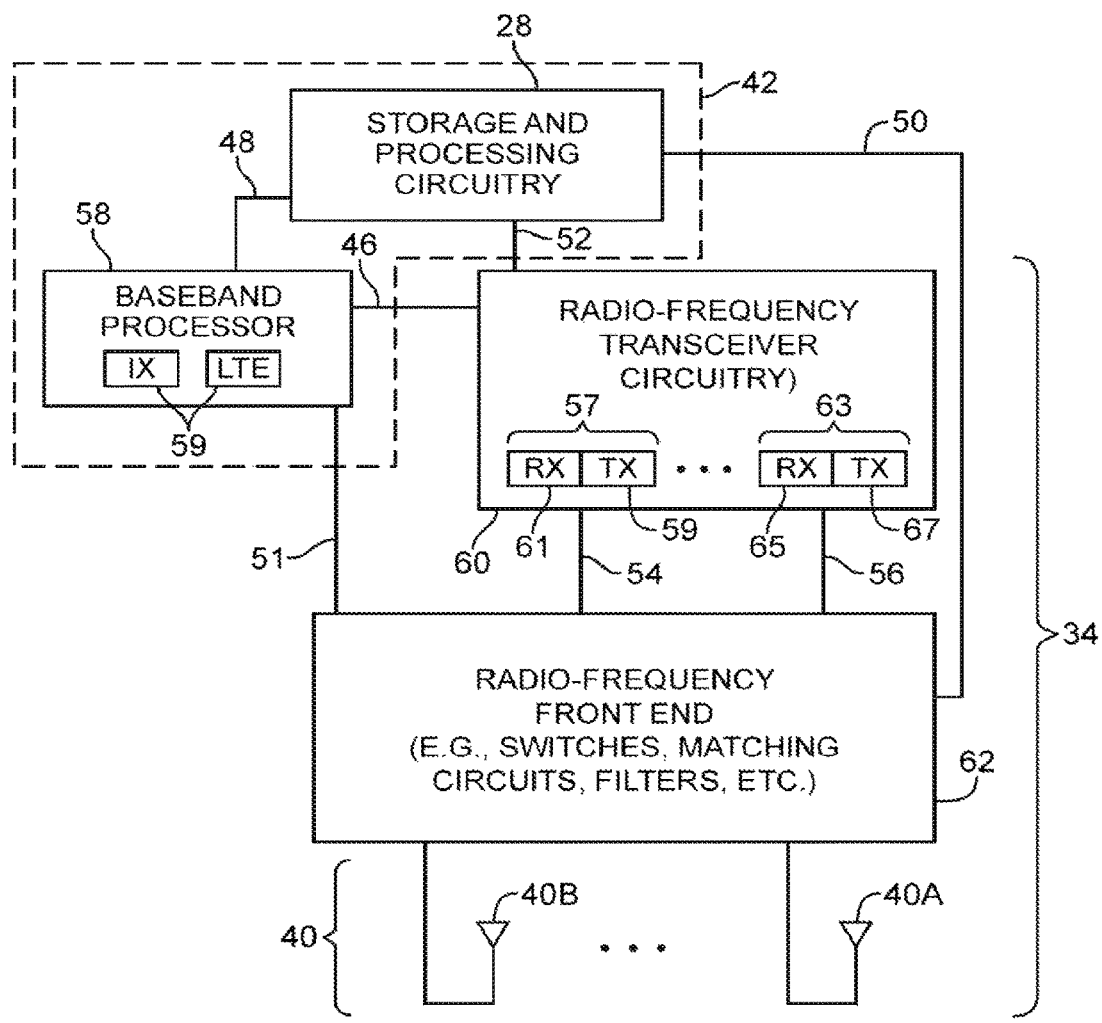
FIG. 3 is a diagram of illustrative wireless circuitry that may be used in an electronic device in accordance with an embodiment of the present invention.

Device 10 can be controlled by control circuitry that is configured to store and execute control code for implementing control algorithms. As shown in FIG. 3, control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of device 10).

Baseband processor 58 may provide data to storage and processing circuitry 28 (e.g., a microprocessor, nonvolatile memory, volatile memory, other control circuits, etc.) via path 48. The data on path 48 may include raw and processed data associated with wireless (antenna) performance metrics for received signals such as received power, transmitted power, frame error rate, bit error rate, channel quality measurements based on received signal strength indicator (RSSI) information, channel quality measurements based on received signal code power (RSCP) information, channel quality measurements based on reference symbol received power (RSRP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, information on whether paging signals have been successfully received, and other information that is reflective of the performance of wireless circuitry 34. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers such as transceivers 57 and 63. Some transceivers may include both a transmitter and a receiver. If desired, one or more transceivers may be provided with receiver circuitry, but no transmitter circuitry (e.g., to use in implementing receive diversity schemes). As shown in the illustrative configuration of FIG. 3, transceiver 57 may include a transmitter such as transmitter 59 and a receiver such as receiver 61 and transceiver 63 may include a transmitter such as transmitter 67 and a receiver such as receiver 65.

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Baseband processor 58 may convert these received signals into digital data that is provided to storage and processing circuitry 28. Baseband processor 58 may also extract information from received signals that is indicative of signal quality for the channel to which the transceiver is currently tuned. For example, baseband processor and/or other circuitry in control circuitry 42 may analyze received signals to produce bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Ec/Io or Ec/No data, etc.

Radio-frequency front end 62 may include a switch that is used to connect transceiver 57 to antenna 40B and transceiver 63 to antenna 40A or vice versa. The switch may be configured by control signals received from control circuitry 42 over path 50 or from the baseband processor 58 over path 51. Circuitry 42 may, for example, adjust the switch to select which antenna is being used to transmit radio-frequency signals (e.g., when it is desired to share a single transmitter in transceiver 60 between two antennas) or which antenna is being used to receive radio-frequency signals (e.g., when it is desired to share a single receiver in transceiver 60 between two antennas). In some modes of operation, a single active receiver may be used to receive incoming signals from a single antenna. In other modes of operation, multiple antennas and multiple receivers may be used in receiving signals.

The number of receivers and antennas that are used may depend on the type of radio access technology that is being used. For example, receipt of incoming 1X traffic may involve use of a single antenna and a single receiver in transceiver circuitry 60 and receipt of incoming LTE traffic may involve use of two antennas and two receivers in transceiver circuitry 60.

Storage and processing circuitry 28 may be used to run software for handling more than one radio access technology. For example, baseband processor 58 may include memory and control circuitry for implementing multiple protocol stacks 59 such as protocol stack 1X and protocol stack LTE. Protocol stack 1X may be associated with a first radio access technology such as CDMA2000 1XRTT (as an example). Protocol stack LTE may be associated with a second radio access technology such as LTE (as an example). During operation, device 10 may use protocol stack 1X to handle 1X functions and may use protocol stack LTE to handle LTE functions. Additional protocol stacks, additional transceivers, additional antennas 40, and other additional hardware and/or software may be used in device 10 if desired. The arrangement of FIG. 3 is merely illustrative.

It may be desirable to minimize the cost and complexity of device 10 by implementing the wireless circuitry of FIG. 3 using an arrangement in which baseband processor 58 and radio-transceiver circuitry 60 can be configured to handle traffic associated with only a single radio access technology at a time. For example, in a configuration in which baseband processor 68 includes protocols stacks such as stacks 1X and LTE for handling 1X and LTE traffic, it may only be possible to handle LTE traffic or 1X traffic at any given time, not both.

In this type of arrangement (sometimes referred to as a single radio configuration), it is possible for the wireless circuitry to be tuned to receive either 1X data (e.g., for a voice call) or LTE data (e.g., for a data session). The inability of device 10 to handle traffic for the 1X and LTE radio access technologies simultaneously creates a conflict between 1X and LTE operations. This conflict may be at least partially resolved by using time division multiplexing to support both 1X and LTE traffic.

The 1X radio access technology may generally be used to carry voice traffic, whereas the LTE radio access technology may generally be used to carry data traffic. To ensure that 1X voice calls are not interrupted due to LTE data traffic, 1X operations may take priority over LTE operations.

When a user has an incoming 1X call, the 1X network may send device 10 a paging signal (sometimes referred to as a page) on the 1X paging channel using base station 21. When device 10 detects an incoming page, device 10 can take suitable actions (e.g., call establishment procedures) to set up and receive the incoming 1X call. Pages are typically sent periodically by the network, so that devices such as device 10 will have multiple opportunities to successfully receive a page.

Proper 1X page reception requires that the wireless circuitry of device 10 be periodically tuned to the 1X paging channel. If the transceiver circuitry 60 fails to tune to the 1X paging channel or if the 1X protocol stack in baseband processor 58 fails to monitor the paging channel for incoming pages, 1X pages will be missed. In contrast, excessive monitoring of the 1X paging may occur if care is not taken, and may have an adverse impact on an active LTE data session.

To conserve power, it may be desirable for the 1X and LTE protocol stacks to support idle mode operations (sometimes referred to as sleep mode functionality). During 1X idle mode, 1X voice operations that can be supported include decoding/monitoring the quick paging channel (Q-PCH) when this feature has been enabled by the network operator, decode/monitor the paging channel, re-registering the device (if the device moves out of its previous registration zone), initiating a system scan when a device enters an out-of-service condition, and reading overhead messages on the network control channel (e.g., messages conveying information such as base station identifier information, network identifier information, information on which optional features have been enabled by the network operator, etc.).

Three potential operating states may be associated with idle mode operation: wake mode, sleep mode, and out-of-service sleep mode.

When in wake mode, the network is monitored for pages and is monitored to determine whether device 10 is in service. If the device is not receiving a page and is in service, the device may be placed in sleep mode. If the device is out of service, a system search may be performed to identify an available network. If no service is available, an out-of-service indicator may be displayed and the device may be placed in the out-of-service sleep mode for a period of time. Upon awakening from the out-of-service sleep mode, the device can once again search for service. If service is detected, the device may be placed in sleep mode.

Periodically, the device may be awakened from sleep mode into wake mode. If the device receives a page during wake mode, a communication link may be established. For example, in a 1X network, call setup operations may be performed to establish a 1X call (e.g., a voice call). Once the call is complete, the device may be returned to sleep mode.

This sleep-wake paging cycle may be repeated continuously during operation of device 10. Each paging cycle, the device may be awoken for a period of time to monitor the paging channel for incoming pages. To conserve power, the device is then returned to sleep mode unless an incoming page is detected.

Device 10 can support active and idle mode operations for both the 1X and LTE radio access technologies. The ability of device 10 to support both 1X and LTE operations concurrently using time division multiplexing depends on the 1X and LTE modes of operation.

Figure 4:
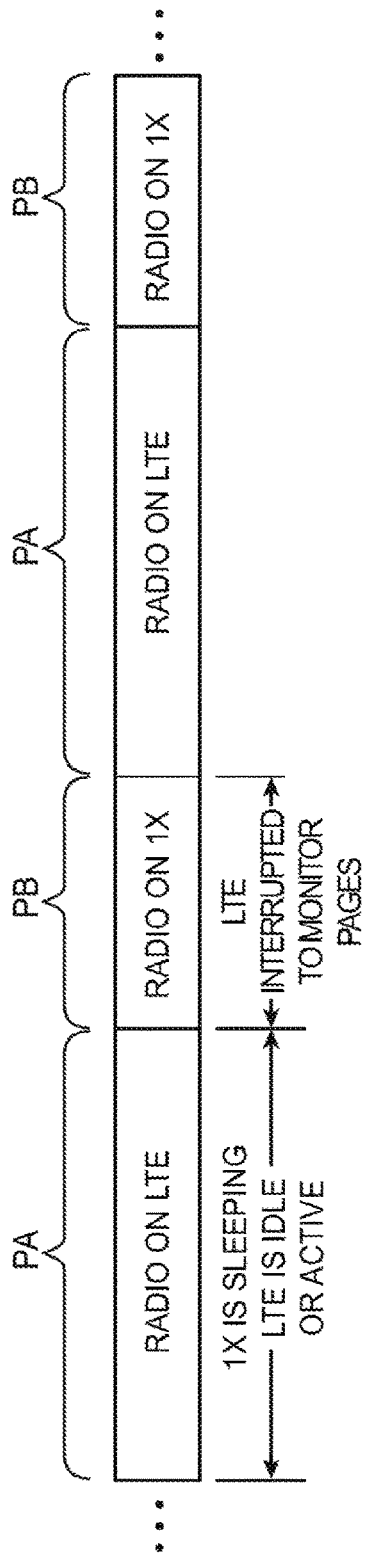
FIG. 4 is a timing diagram showing how an electronic device that supports first and second radio access technologies can periodically interrupt wireless operations associated with the first radio access technology, e.g., period PA, to monitor a paging channel associated with the second radio access technology, e.g., period PB, in accordance with the present invention.

Consider, as an example, the situation in which baseband processor 58 and protocol stack 1X are being used to support 1X operations in idle mode while baseband processor 58 and protocol stack LTE are being used to support LTE operations in either idle mode or active mode. This type of arrangement is illustrated in FIG. 4. As shown in FIG. 4, device 10 may alternate between periods PA and PB. During periods PA, the 1X features of device 10 may be placed in sleep mode and the LTE features of device 10 may be either idle or active.

During periods PB (i.e., once per paging cycle), the 1X features of device 10 may be awoken and LTE operations may be interrupted while device 10 monitors the 1X paging channel. Because the 1X features of device 10 are operating in idle mode, there are significant periods of time (e.g., periods PA) in which LTE operation is not disrupted.

Figure 5:
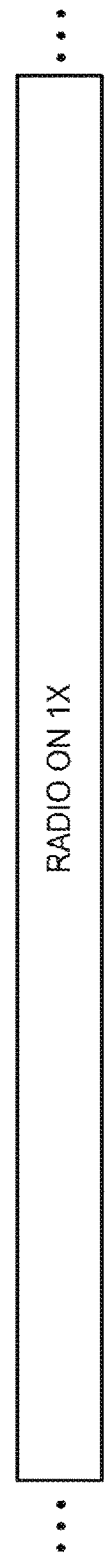
FIG. 5 is a timing diagram showing how use of a second radio access technology to support an operation such as a voice call may take priority over use of a first radio access technology in accordance with an embodiment of the present invention.

If, however, the 1X features of device 10 are active (e.g., to support a voice call), there will be no opportunity to support LTE traffic, as shown in FIG. 5. This is because a 1X voice call has higher priority than LTE data traffic.

The table of FIG. 6 shows how a device with wireless circuitry that can be tuned to support 1X operations or LTE operations, but not both simultaneously, may operate depending on whether the 1X functions of the wireless circuitry are active or idle and whether or not LTE functions of the wireless circuitry are active.

As shown in FIG. 6, when 1X is idle and LTE is idle (the upper left entry in the table of FIG. 6), the wireless circuitry of device 10 can tune to the 1X paging channel every paging cycle, as illustrated by periods PB in FIG. 4. While LTE is idle and is not being interrupted by the 1X page monitoring operations (i.e., during appropriate portions of periods PA of FIG. 4), the LTE paging channel may be monitored for LTE pages.

When 1X is active (the lower left and lower right entries in the table of FIG. 6), the wireless circuitry of device 10 will be tuned continuously to a 1X channel (e.g., to carry a voice call). As shown in FIG. 5, no LTE traffic can be handled by device 10 in this situation.

As the table of FIG. 6 demonstrates, when 1X traffic is being actively handled by device 10, there is no possibility for handling LTE traffic. When both 1X and LTE functions are in idle mode, device 10 can use time division multiplexing so that the radio (e.g., baseband processor 58) of device 10 can alternately monitor the 1X paging channel for incoming 1X pages and the LTE paging channel for incoming LTE pages. When 1X is idle and LTE is active, care should be taken to ensure that LTE operations are not disrupted more than desired when device 10 monitors the 1X paging channel for 1X pages.

When the LTE operation of device 10 has not been disrupted, device 10 can operate in a radio resource control (RRC) connected (RRC Connected) state with no additional procedures. When the LTE operation of device 10 has been disrupted sufficiently long, RRC connection reestablishment procedures will be required to reestablish the full RRC_Connected state. This is referred to as "RRC_Connected state with reestabilishment procedures". When LTE operation of device 10 is disrupted sufficiently long to lose LTE RRC connectivity, device 10 will be forced into LTE idle mode. In this situation, RRC connection procedures will generally be necessary to fully reconnect to the LTE network. These RRC connection procedures may require about 300-500 ms to complete (as an example).

To minimize disruption to LTE operations when monitoring the 1X paging channel for 1X pages, it is therefore generally desirable to avoid interrupting the LTE connection for a sufficiently long duration that may force device 10 into idle mode. If desired, disruption to LTE operations may be further minimized by avoiding interruptions to the LTE connection that would force the device into the RRC Connected State with reestablishment procedure.

Device 10 may control how much LTE operations are disrupted by limiting the amount of time for which the radio (i.e., baseband processor 58, using transceiver circuitry 60) monitors the 1X paging channel each paging cycle. In particular, device 10 may set the amount of time during which baseband processor 58 monitors the 1X paging channel each cycle to a value that is less than the time period at which device 10 would transition into LTE idle mode or to a value that is less than the time period at which device 10 would transition into the RRC_Connected state with reestablishment procedure.

Operating parameters that may be used by baseband processor 58 in ensuring that LTE operations are not disrupted more than desired when monitoring 1X pages include an LTE out-of-sync counter and LTE out-of-sync timers. When using other radio access technologies, other operating parameters may be involved in ensuring that data session operations are not disrupted by more than desired to monitor voice call pages. The use of LTE out-of-sync counter and timer parameters is merely illustrative.

In a typical scenario, LTE operations will be disrupted (out-of-sync) as soon as baseband processor 58 tunes to the 1X paging channel to monitor for incoming 1X pages. While the baseband processor 58 is tuned to the 1X paging channel, no LTE traffic will be received. In order for LTE to function properly after 1X paging operations are complete, protocol stack LTE (FIG. 3) preferably continues to run as if the LTE downlink is in a deep fade during 1X page monitoring actions. The protocol stacks 1X and LTE operate at multiple layers. The lowest layer, layer 1 (L1) is sometimes referred to as the physical layer. The third layer (L3) is sometimes referred to as the RRC layer. When the LTE downlink is in the deep fade (i.e., when LTE is out-of-sync) due to the temporary 1X paging channel monitoring activity, layer one (L1) of protocol stack LTE reports an "out-of-sync" condition to layer 3 (L3) of the protocol stack LTE.

Figure 7:
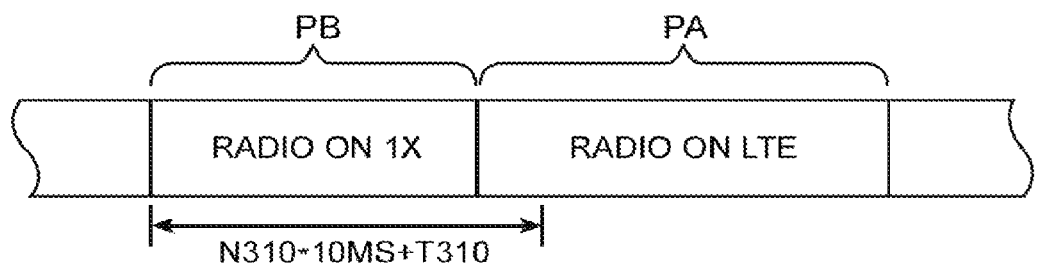
FIG. 7 is a timing diagram showing how a paging channel monitoring time period may be limited in length so as not to exceed a predetermined time limit that would result in loss of Long Term Evolution registration in accordance with an embodiment of the present invention.

As shown in FIG. 7, the amount of time that LTE operations can be interrupted before causing LTE operations to transition from RRC_Connected mode to RRC_Connected state with reestablishment procedure is given by expression (1).

$$N310*(10\text{ ms})+T310 \qquad (1)$$

In expression 1, N310 is maximum value for the LTE out-of-sync counter that is used to count out-of-sync events and T310 is the maximum value for a first LTE out-of-sync timer that begins timing operations once the out-of-sync counter reaches N310 (i.e., T310 represents a first out-of-sync time limit). T311, which is not used in expression 1, is the maximum value for a second LTE out-of-sync timer and represents the amount of time before an LTE RRC connection is lost and LTE operations transition to LTE idle mode. During operation, protocol stack LTE performs out-of-sync timing operations using the out-of-sync counter and first and second out-of-sync counters. Out-of-sync timing operations begin as soon as the wireless circuitry is tuned away from LTE to 1X to monitor the 1X paging channel (i.e., as soon as the process of conveying LTE wireless data traffic is interrupted by temporarily tuning to the 1X channel).

Any suitable circuitry in device 10 may be used to perform timing operations associated with coordinating the use of the 1X and LTE radio access technologies. For example, protocol stack LTE may maintain an out-of-sync counter value that is compared to the LTE parameter N310 and may maintain first and second out-of-sync timers that are compared respectively to out-of-sync time limits T310 and T311. Storage and processing circuitry 28 (e.g., an applications processor) may, if desired, perform timing operations associated with temporarily tuning wireless circuitry 34 away from handling LTE data to perform 1X page monitoring. Other resources associated with device 10 may, if desired, be used to perform timing and control operations associated with controlling the amount of time during which LTE operations are temporarily interrupted to monitor the 1X paging channel for incoming pages. Device resources that may be used in performing these operations may include resources such as processing circuitry associated with baseband processor 58, one or more additional processors, software implemented on storage and processing circuitry 28 other than protocol stacks 1X and LTE, protocol stacks 1X and LTE, and other software and hardware resources in device 10.

The well-known LTE parameters N310, T310, and T311 may have their values established by the LTE network. In a typical LTE network, N310 might be a number from 10-20, T310 might be 2000 ms, and T311 might be 3000 ms (as examples). The value of "10 ms" in expression 1 corresponds to the amount of time that is required to report the out-of-sync condition from L1 to L3 in protocol stack LTE and is sometimes referred to as the "lower-layer-to-upper-layer (L1 to L3) reporting interval." The magnitude of this value need not be 10 ms. Expression 1 is merely illustrative. In expression 1, the product N310\*10 ms corresponds to a maximum time associated with out-of-sync events. For example, if N310 is 20, the value of N310\*10 ms will be 200 ms. The sum of this 200 ms value and the value of T310 may be (for example), 2200 ms and may represent a possible maximum amount of time for interrupting the process of conveying LTE data traffic with the wireless circuitry of device 10.

As shown in FIG. 7, during operation in LTE active mode, device 10 may (in a time-division-multiplexing fashion) alternate between periods PA in which LTE is active and device 10 is handling LTE traffic and periods PB in which device 10 is using baseband processor 58 to tune to and monitor the 1X paging channel. To ensure that device 10 transitions only to RRC Connected State with reestablishment procedure and not LTE idle mode when interrupted by the 1X monitoring of period PB, device 10 may enforce a policy that limits the length of 1X monitoring period PB (including tune away latency and radio-frequency warm up latency associated with use of transceiver circuitry 60) to less than N310\*10 ms+T310+T311. To ensure that device 10 stays in RRC Connected State when interrupted by the 1X monitoring of period PB, device 10 may enforce a policy that limits the length of 1X monitoring period PB (including tune away latency and radio-frequency warm up latency associated with use of transceiver circuitry 60) to less than N310\*10 ms+T310. To ensure that 1X pages are successfully received, the 1X paging cycle (i.e., the monitoring operations of period PB) may be repeated (e.g., three times or other suitable number of times) before it is concluded that no pages are present. This makes it acceptable for device 10 to miss an incoming page during its first attempt. Device 10 may enforce this type of policy without any additional support from the wireless network. The amount of disruption to LTE data session throughput due to the 1X paging channel monitoring activities will be proportional to PA/(PA+PB) (i.e., throughput loss is proportional to outage time).

In some situations, it may be desirable to enforce a policy on device 10 that allows the length of period PB to be greater than the time limit set forth in expression 1. Two possible outcomes may be associated with this type of situation, depending on whether or not the RRC connection is reestablished successfully following the tune-away event to monitor the 1X paging channel.

Figure 8:
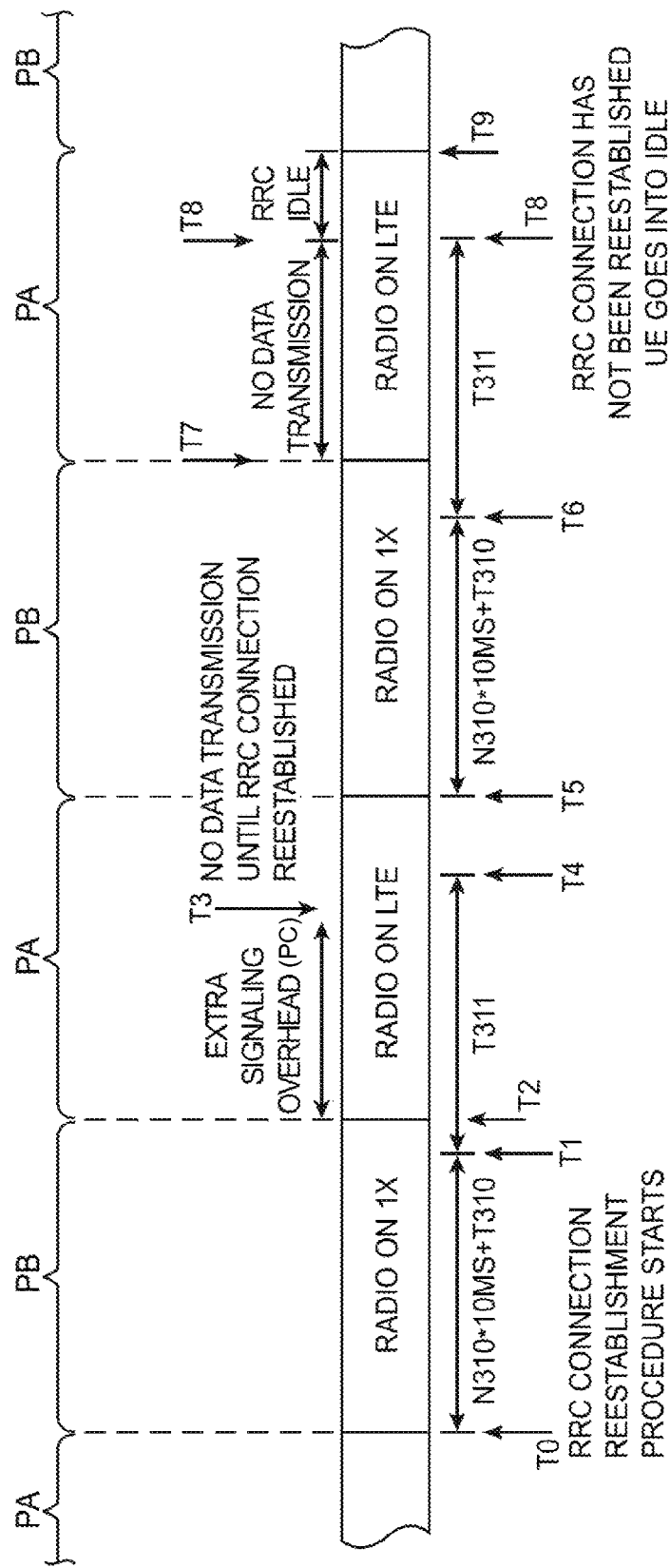
FIG. 8 is timing diagram showing how a paging channel monitoring time period may be limited in length so as not to exceed a predetermined time limit that would result in loss of Long Term Evolution registration or so as not to result in transitioning to a Long Term Evolution idle mode in accordance with an embodiment of the present invention.

Consider, as a first scenario, the 1X paging channel monitoring period PB that begins at time T0 of FIG. 8. At time T1, the LTE RRC connection is considered out-of-sync, and the timer associated with out-of-sync time limit T311 is started. Note that when timer T311 expires, LTE transitions from RRC Connected to RRC idle state. Monitoring of the 1X paging channel ends at time T2, which is before T311 has expired. During time period PC (i.e., from time T2 to T3), protocol stack LTE uses LTE reestablishment procedures to reestablish an RRC connection between device 10 and the LTE network. Time T4 designates the point at which device 10 would have transitioned to idle mode, corresponding to the time that T311 would have expired, in the event that the RRC connection had not been established. Because, in this scenario, the RRC connection was successfully established at time T3, LTE data traffic can be conveyed between the network and device 10 during the time between time period T3 and time period T5. The loss of the RRC connection at time T1 disrupts LTE data transmissions more than in the scenario of FIG. 7 (in which period PB was less than N310\*10 ms+T310 so that the full RRC connectivity was maintained and re-establish procedures did not have to be invoked), but because the RRC connection was reestablished at a time (time T3) before time T4, device 10 does not transition to LTE idle mode and does not incur the time penalties associated with RRC reconnection procedures.

Consider, as a second scenario, the 1X paging channel monitoring period that begins at time T5 of FIG. 8. In this scenario, at time T6, timer T311 is started. At time T7, RRC Connect re-establishment procedures are started. At time T7, even though 1X page monitoring operations have ceased and the baseband processor has been tuned back to the LTE network, no LTE data can be transmitted or received since the LTE connection has not been reestablished (in this illustrative example). At time T8, the amount of time that has elapsed since time T5 exceeds expression 2.

$$N310*10 \text{ ms} + T310 + T311 \qquad (2)$$

Expression 2 corresponds to a time limit for remaining out of the LTE idle mode. After the time limit of expression 2 has been exceeded (i.e., at time T8), device 10 transitions to LTE idle mode (RRC idle) at time T9, at which point the network tears down the data session. To recover from this type of disruption to LTE service, device 10 will need to perform RRC connection procedures.

Figure 9:
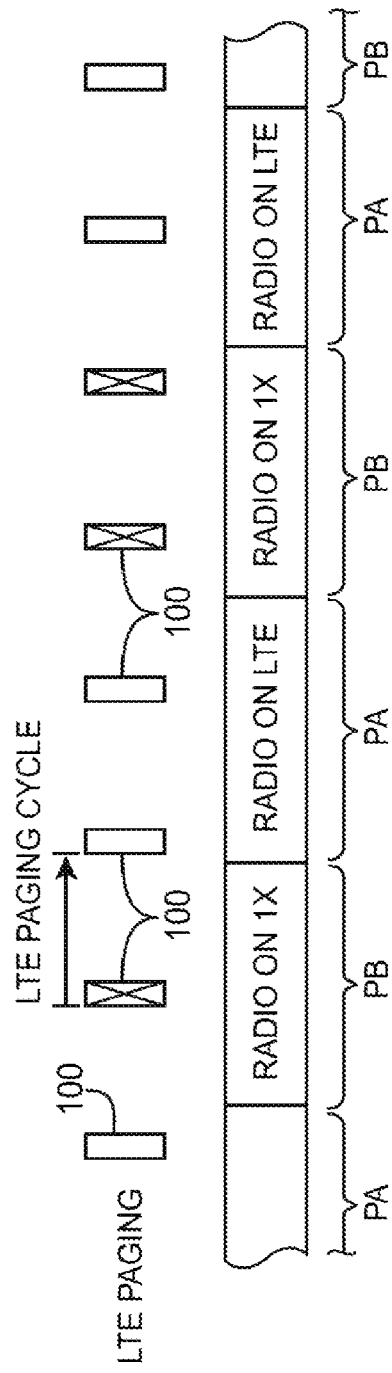
FIG. 9 is a timing diagram showing how paging channel monitoring periods associated with different radio access technologies may occasionally interfere with each other without completely blocking page reception in accordance with an embodiment of the present invention.

There may be occasional overlaps between the 1X and LTE paging cycles. Consider, as an example, a situation in which the paging cycle for the 1X network is 5.12 seconds and the LTE paging cycle is 1.28 seconds (LTE paging cycles are typically in the range of 320 ms to 2.56 s). Depending on the offset between the LTE and 1X page monitoring events and the duration of each page monitoring event, it may be possible for the protocol stack LTE to miss several paging messages during one 1X page monitoring outage. This is shown in FIG. 9. In FIG. 9, LTE page monitoring events are illustrated by boxes 100. LTE outages due to 1X page monitoring events are illustrated by periods PB. As shown by the "X" marks on several of the LTE page monitoring events 100, multiple LTE page monitoring events may sometimes be blocked by the 1X page monitoring events. As a worst case, one or more LTE pages will be missed every four LTE paging cycles. However, not all LTE pages will be blocked.

Figure 10:
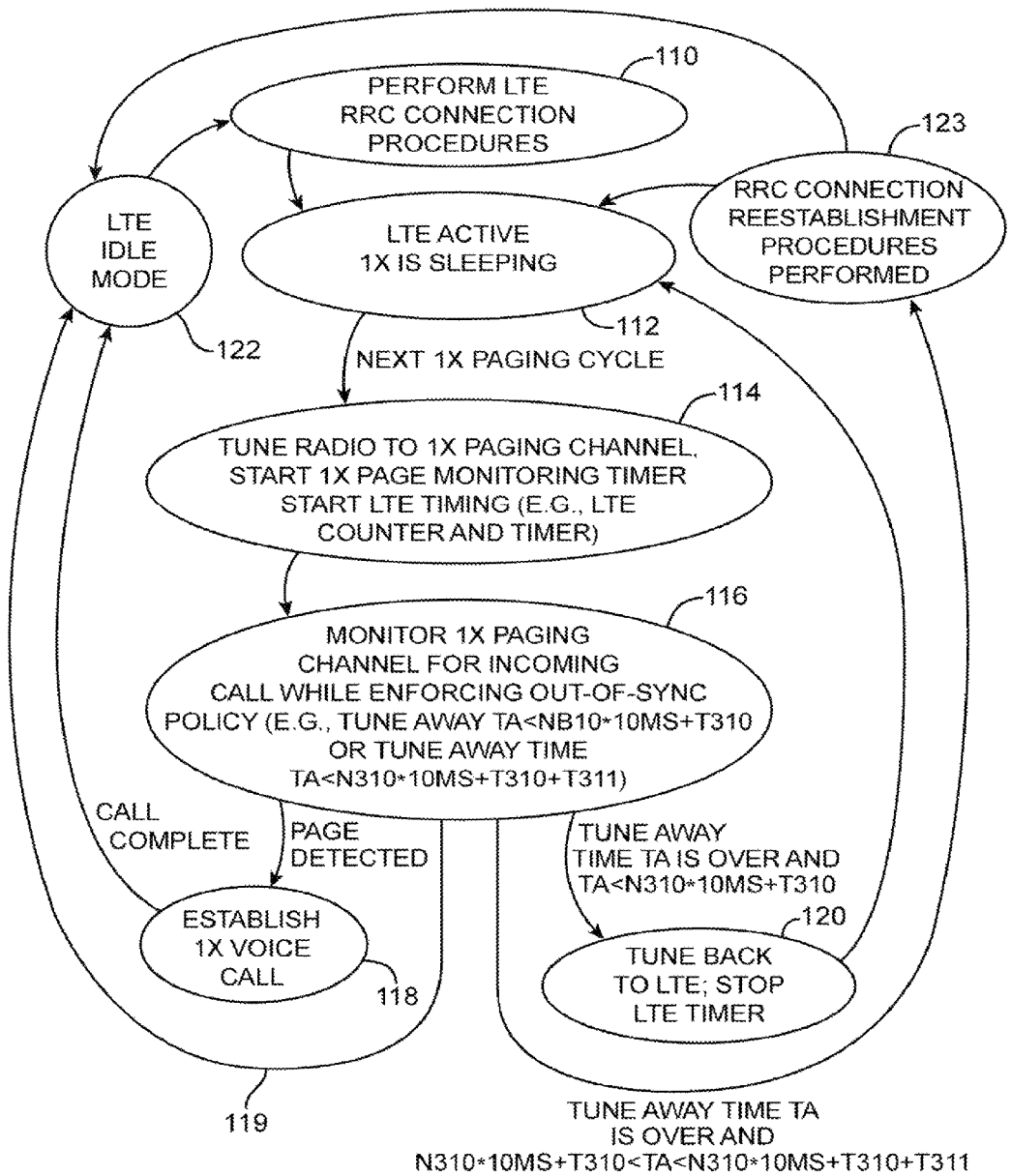
FIG. 10 is a flow chart of illustrative steps involved in operating an electronic device that supports multiple radio access technologies in accordance with an embodiment of the present invention.

Illustrative steps involved in performing LTE and 1X page monitoring operations are shown in FIG. 10. At step 112, device 10 may be actively handling LTE data traffic (i.e., device 10 may be in an LTE RRC connected state) while the 1X protocol stack in device 10 is sleeping. When it is time for the next 1X page monitoring event (i.e., the beginning of period PB of FIG. 4, corresponding to the 1X paging time), baseband processor 58 may temporarily tune to the 1X paging channel in preparation for monitoring the 1X paging channel for incoming 1X pages (step 114). At step 114, a 1X page monitoring timer may be re-started by device 10 (e.g., by storage and processing circuitry 28) to time 1X page monitoring operations (i.e., the length of period PB). During the operations of step 114, protocol stack LTE in device 10 also may start LTE timing operations. The timing operations of protocol stack LTE may be implemented using expression 1.

At step 116, baseband processor 58 (i.e., protocol stack 1X) may monitor the 1X paging channel for incoming 1X pages. Because processor 58 has tuned to the 1X paging channel, the LTE functions of processor 58 will be in an "out-of-sync" condition (i.e., the physical layer L1 of protocol stack LTE will be out of sync). During the operations of step 116, storage and processing circuitry 28 enforces a desired out-of-sync policy. An example of a policy that may be enforced is a policy that limits the tune away time TA (i.e., the length of 1x page monitoring period PB) to a magnitude that is less than a time limit established by the value of N310*10 ms+T310 (expression 1). Another example of a policy that may be enforced is a policy that limits the tune away time TA to less than N310*10 ms+T310+T311(expression 2). Other tune away time (out-of-sync) policies may be used if desired.

If the device has finished monitoring 1x pages and no incoming call is detected or the 1X tune away time has reached the applicable time limit, device 10 may use processor 58 to tune back to LTE and to stop LTE timing operations (step 114). Processor 58 may then tune back to LTE and, following appropriate reestablishment and/or reconnection procedures, as appropriate, may be used to handle LTE traffic.

If a 1X page is detected during the 1X page monitoring operations of step 116, a 1X connection (e.g., a 1X voice call) may be established at step 118. When the call is complete, storage and processing circuitry 28 may tune the wireless circuitry of device 10 back to LTE. If the duration of the call is longer than N310*10 ms+T310+T311, device 10 will be in LTE idle mode (i.e., RRC connectivity will have been lost), as shown by step 122. Device 10 may then perform LTE RRC connection procedures (step 110) to return to active mode 112.

There are several exit points from step (or state) 116. If a page is detected, device 10 transitions from state 116 to state 118. If tune away time TA is less than N310*10 ms+T310, then state 116 transitions to state 120. If TA is larger than N310*10 ms+T310 but less than N310*10 ms+T310+T311, then state 116 transitions to state 123. During state 123, the LTE protocol stack in device 10 invokes RRC Connect re-establishment procedures. State 123 can either transition to state 112 (if T311 does not expire during re-establishment) or 122 (if T311 does expire during re-establishment). (In a scenario in which TA is larger than N310*10 ms+T310+T311—i.e., because a device has not enforced at tune-away time limit restricting TA to less than N310*10 ms+T310+T311, state 116 transitions to state 122, as illustrated by line 119.)

The foregoing is merely illustrative of the principles of this invention and various modifications can be made by those skilled in the art without departing from the scope and spirit of the invention.

What is claimed is:

1. A method for using an electronic device to communicate with a wireless network using a first radio access technology (RAT) and a second RAT, the method comprising:

by the electronic device while operating in an active mode in accordance with the first RAT:

conveying wireless data traffic via the first RAT using wireless circuitry of the electronic device;

temporarily interrupting the conveying of the wireless data traffic for an interruption time period, during which communication via the first RAT is disrupted, to monitor a paging channel associated with the second RAT;

enforcing a time limit on the temporary interruption of the conveying of the wireless data traffic; and resuming the conveying of the wireless data traffic using the first RAT subsequent to the interruption time period, wherein enforcing the time limit comprises limiting the interruption time period to less than a maximum out-of-sync time period allowed while operating in the active mode in accordance with the first RAT and after which the electronic device would transition from the active mode to an idle mode in accordance with the first RAT.

2. The method as recited in claim 1, wherein enforcing the time limit further comprises limiting the interruption time period to less than a radio resource control (RRC) timeout time period of the first RAT and after which the electronic device would transition from an RRC connected state to an RRC with re-establishment procedure state in accordance with the first RAT.

3. The method as recited in claim 1, wherein the maximum out-of-sync time period corresponds to a maximum time associated with out-of-sync events plus a first out-of-sync time limit and a second out-of-sync time limit in accordance with the first RAT.

4. The method as recited in claim 3, wherein the maximum time associated with out-of-sync events is equal to a product of a maximum out-of-sync counter value and a lower-layer-to-upper-layer reporting interval.

5. The method as recited in claim 3, wherein the first RAT comprises a Long Term Evolution (LTE) RAT, and wherein the first out-of-sync time limit comprises an LTE T310 time limit.

6. The method as recited in claim 4, wherein the first RAT comprises a Long Term Evolution (LTE) RAT, and wherein the maximum out-of-sync counter value comprises an LTE N310 counter value.

7. The method as recited in claim 4, wherein the lower-layer-to-upper- layer reporting interval comprises a layer 1 to layer 3 reporting interval.

8. The method as recited in claim 2, wherein the RRC timeout time period of the first RAT is less than the maximum out-of-sync time period of the first RAT.

9. The method as recited in claim 2, wherein the RRC timeout time period of the first RAT corresponds to a maximum time associated with out-of-sync events plus a first out-of-sync time limit in accordance with the first RAT.

10. The method as recited in claim 9, wherein the first RAT comprises a Long Term evolution (LTE) RAT, and wherein the first out-of-sync time limit comprises an LTE T310 time limit.

11. The method as recited in claim 1, wherein the second RAT comprises a code division multiple access (CDMA) RAT, and wherein the paging channel comprises a CDMA paging channel.

12. The method as recited in claim 1, wherein the first RAT comprises a Long Term Evolution (LTE) RAT, and wherein the wireless data traffic comprises an active LTE data session.

13. The method as recited in claim 12, wherein the second RAT comprises a code division multiple access (CDMA) RAT, and wherein the paging channel comprises a CDMA paging channel.

14. The method as recited in claim 1, wherein:
the wireless circuitry includes a baseband processor having at least first and second protocol stacks associated respectively with the first and second RATs,
the second protocol stack is configured to monitor the paging channel associated with the second RAT while temporarily interrupting the conveying of the wireless data traffic, and
the first protocol stack maintains an out-of-sync timer that is initiated when the conveying of the wireless data traffic is interrupted.

15. An electronic device, comprising:
radio-frequency transceiver circuitry;
at least one antenna coupled to the radio-frequency transceiver circuitry; and
storage and processing circuitry coupled to the radio-frequency transceiver circuitry, wherein the storage and processing circuitry is configured to cause the electronic device, while operating in an active mode in accordance with a first radio access technology (RAT), to:
convey wireless data traffic to a wireless network via the first RAT;
temporarily interrupt the conveying of the wireless data traffic for an interruption time period, during which communication via the first RAT is disrupted, to monitor a paging channel associated with a second RAT;
enforce a time limit on the temporary interruption of the conveying of the wireless data traffic; and
resume the conveying of the wireless data traffic using the first RAT subsequent to the interruption time period,
wherein the electronic device enforces the time limit by at least limiting the interruption time period to less than a maximum out-of-sync time period allowed while operating in the active mode in accordance with the first RAT after which the electronic device would transition from the active mode to an idle mode in accordance with the first RAT.

16. The electronic device as recited in claim 15, wherein:
the radio-frequency transceiver circuitry supports wireless communication with the wireless network using the first RAT comprising a Long Term Evolution (LTE) RAT and the second RAT comprising a Code Division Multiple Access (CDMA) RAT, and
the time limit corresponds to a maximum time associated with out-of-sync events plus a first out-of-sync time limit and a second out-of-sync time limit in accordance with the first RAT.

17. The electronic device as recited in claim 16, wherein the electronic device further enforces the time limit by at least limiting the interruption time period to less than a radio resource control (RRC) timeout time period of the first RAT after which the electronic device would transition from an RRC connected state to an RRC with re-establishment procedure state in accordance with the first RAT.

18. The electronic device as recited in claim 17, wherein the RRC timeout time period of the first RAT is less than the maximum out-of-sync time period of the first RAT.

19. The electronic device as recited in claim 18, wherein the RRC timeout time period of the first RAT comprises the maximum time associated with out-of-sync events plus the first out-of-sync time limit in accordance with the first RAT.

20. A non-transitory computer readable storage medium having computer program code stored thereon, the computer program code configured to, when executed by processing circuitry implemented on an electronic device, cause the electronic device, while operating in an active mode in accordance with a first radio access technology (RAT), to:
convey wireless data traffic to a wireless network via the first RAT;
temporarily interrupt the conveying of the wireless data traffic for an interruption time period, during which communication via the first RAT is disrupted, to monitor a paging channel associated with a second RAT;
enforce a time limit on the temporary interruption of the conveying of the wireless data traffic; and
resume the conveying of the wireless data traffic using the first RAT subsequent to the interruption time period,
wherein the electronic device enforces the time limit by at least limiting the interruption time period to less than a maximum out-of-sync time period allowed while operating in the active mode in accordance with the first RAT after which the electronic device would transition from the active mode to an idle mode in accordance with the first RAT.

* * * * *